United States Patent
Kitahara

(10) Patent No.: US 12,500,400 B2
(45) Date of Patent: Dec. 16, 2025

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Yuta Kitahara, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 193 days.

(21) Appl. No.: 18/287,484

(22) PCT Filed: Mar. 22, 2022

(86) PCT No.: PCT/JP2022/013227
§ 371 (c)(1),
(2) Date: Oct. 19, 2023

(87) PCT Pub. No.: WO2022/230458
PCT Pub. Date: Nov. 3, 2022

(65) Prior Publication Data
US 2024/0388073 A1    Nov. 21, 2024

(30) Foreign Application Priority Data

Apr. 27, 2021   (JP) ................................ 2021-075054

(51) Int. Cl.
*H02G 3/04*     (2006.01)
*H01B 7/00*     (2006.01)

(52) U.S. Cl.
CPC ......... *H02G 3/0487* (2013.01); *H01B 7/0045* (2013.01); *H02G 3/0412* (2013.01)

(58) Field of Classification Search
CPC .... H01B 7/0045; B60R 6/0215; B60R 6/0207
See application file for complete search history.

(56) References Cited

U.S. PATENT DOCUMENTS

| | | | |
|---|---|---|---|
| 2005/0258410 A1* | 11/2005 | Andrews | ................ H02G 1/086 254/134.4 |
| 2019/0222015 A1 | 7/2019 | Ito et al. | |
| 2019/0299884 A1 | 10/2019 | Hagi | |
| 2020/0079302 A1 | 3/2020 | Omae | |

FOREIGN PATENT DOCUMENTS

| | | |
|---|---|---|
| JP | S60-13613 U | 1/1985 |
| JP | 2007-103045 A | 4/2007 |

OTHER PUBLICATIONS

Jun. 14, 2022 International Search Report issued in International Patent Application No. PCT/JP2022/013227.

\* cited by examiner

*Primary Examiner* — Paresh Paghadal
(74) *Attorney, Agent, or Firm* — Oliff PLC

(57) ABSTRACT

A wire harness that includes: an exterior tube that is flexible and tubular; and electric wires inserted into the exterior tube, wherein the exterior tube is brought close to or into close contact with the electric wires by adjusting an internal pressure of the exterior tube to be lower than atmospheric pressure.

4 Claims, 7 Drawing Sheets

WIRE HARNESS

BACKGROUND

The present disclosure relates to a wire harness.

JP 2018-101510A discloses a wire harness that includes a plurality of electric wires including a high-voltage electric wire connected to a high-voltage battery, and a tubular exterior member collectively surrounding the plurality of electric wires. The electric wires generate heat when current is passed therethrough, and the heat generated by the electric wires is transferred to the exterior member and released into the atmosphere from the outer circumferential surface of the exterior member.

SUMMARY

The exterior member of the wire harness according to JP 2018-101510A is constituted by a metal pipe. Therefore, air exists between the outer surfaces of the electric wires and the inner surface of the exterior member. Air has a low thermal conductivity, and therefore the thermal resistance between the electric wires and the exterior member is high, and heat is trapped in the exterior member. In particular, in the case of a waterproof wire harnesses, the interior of the exterior member is sealed in a liquid-tight manner. Therefore, hot air in the exterior member cannot escape to the atmosphere, and heat is likely to be trapped.

The wire harness according to an exemplary aspect of the present disclosure has been completed based on the above-described circumstances, and aims to improve heat dissipation.

A wire harness according to the present disclosure includes: an exterior tube that is flexible and tubular; and electric wires inserted into the exterior tube, wherein the exterior tube is brought close to or into close contact with the electric wires by adjusting an internal pressure of the exterior tube to be lower than atmospheric pressure.

The present disclosure is capable of improving heat dissipation.

DETAILED DESCRIPTION OF EMBODIMENTS

Description of Embodiments of Present Disclosure

Figure 1:
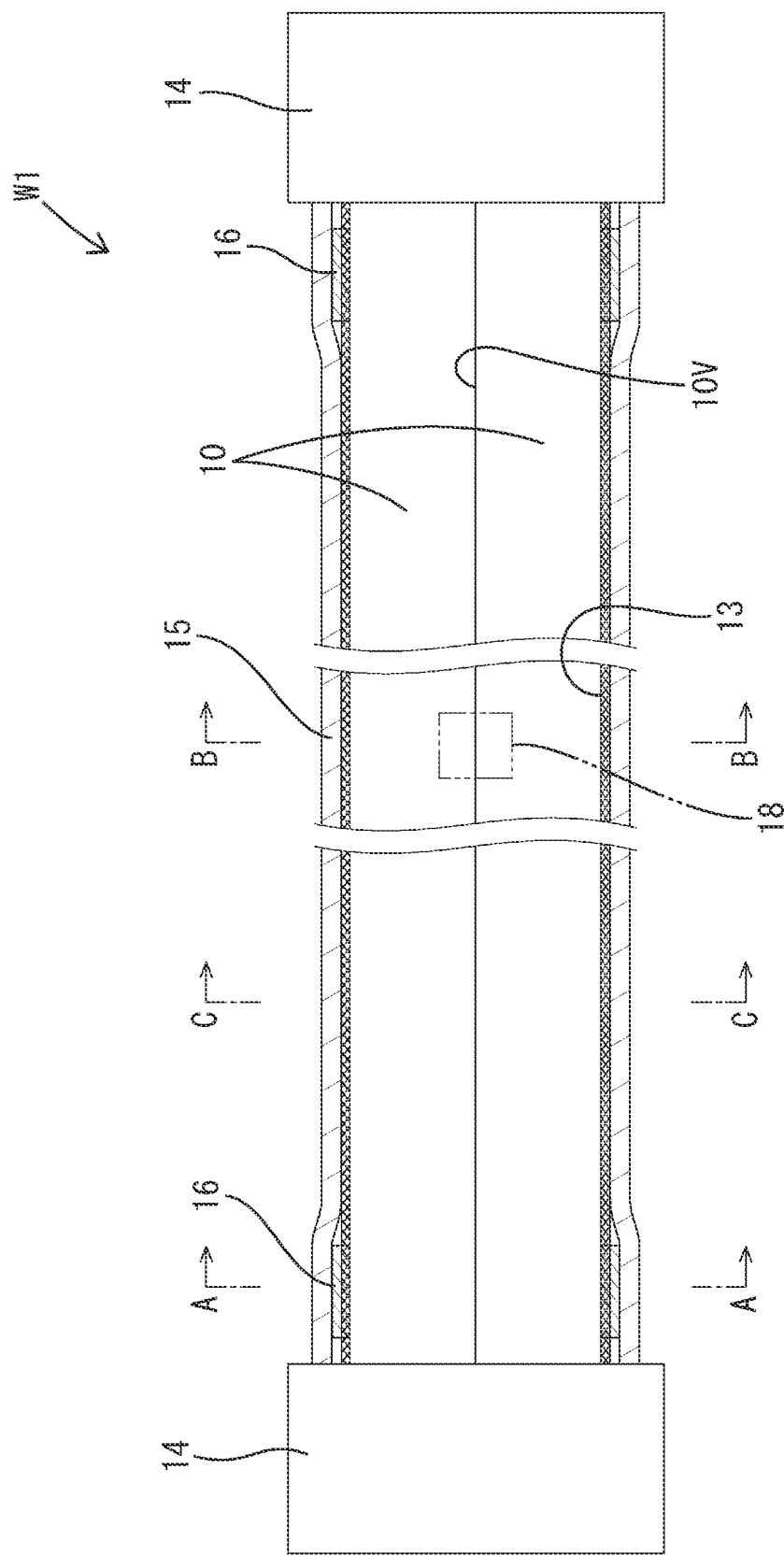
FIG. 1 is a partially cutaway plan view of a wire harness according to a first embodiment, showing a state where the interior of an exterior member thereof is vacuumed.

First, embodiments of the present disclosure will be listed and described.

A wire harness according to the present disclosure includes:

(1) an exterior member that is flexible and tubular; and electric wires inserted into the exterior member, wherein the exterior member is brought close to or into close contact with the electric wires by adjusting an internal pressure of the exterior member to be lower than atmospheric pressure. With the configuration according to the present disclosure, the exterior member is close to or in close contact with the electric wires, and therefore the amount of air that intervenes between the electric wires and the exterior member to create thermal resistance is minimal. As a result, the heat transfer efficiency from the electric wires to the exterior member is favorable, which provides excellent heat dissipation.

(2) It is preferable that the exterior member is provided with a check valve that allows air in the exterior member to flow out to an atmosphere, and restricts air from flowing into an interior of the exterior member. With this configuration, it is possible to adjust the internal pressure of the exterior member to be lower than the atmospheric pressure by vacuuming the exterior member through the check valve. Even if the pressure of the airtight space increases, it is possible to return the internal pressure of the exterior member to be lower than the atmospheric pressure by vacuuming the exterior member through the check valve.

(3) In (2), it is preferable that the check valve is positioned so as to face a valley between two adjacent electric wires provided as the electric wires. With this configuration, in the vacuuming process, the air in the exterior member flows toward the valley between the electric wires and the exterior member approaches the outer circumferential surfaces of the electric wires from the sides far from the valley. Since the check valve is positioned so as to face the valley, it is possible to prevent air from remaining in regions other than the region in the valley.

(4) In (2) or (3), it is preferable that the wire harness further includes airtight keeping members that keep an internal space of the exterior member airtight, and the check valve is positioned in an intermediate region between two airtight keeping members provided as the airtight keeping members, in an axial direction of the electric wires. When the check valve is provided in the vicinity of one of the airtight members, the exhaust path for vacuuming from the other airtight keeping member to the check valve is long. However, the check valve is positioned in the intermediate region between the two airtight keeping members, and therefore the exhaust path from the airtight keeping members to the check valve is shorter.

(5) In (1) to (4), it is preferable that the wire harness further includes airtight keeping members that keep an internal space of the exterior member airtight, and the airtight keeping members are sealing members formed by curing a gel resin material. With this configuration, it is possible to keep the internal space of the exterior member airtight even when members having fine irregularities such as braided wires are interposed between the outer circumferential surfaces of the electric wires and the inner circumferential surface of the exterior member.

(6) In (1) to (4), it is preferable that the wire harness further includes airtight keeping members that keep an internal space of the exterior member airtight, and each of the airtight keeping members includes: an electric wire holding member that allows the electric wires to hermetically pass therethrough; and a clamping member that hermetically clamps the exterior member between the clamping member and an outer circumferential surface of the electric wire holding member. With such a configuration, it is possible to mechanically maintain the airtight state of the internal space of the exterior member, and therefore there is no need for heat treatment or curing for hardening, unlike in the case where an adhesive is used.

DETAILED DESCRIPTION OF EMBODIMENTS ACCORDING TO THE PRESENT DISCLOSURE

First Embodiment

A first embodiment that embodies a wire harness according to the present disclosure will be described with reference to FIGS. 1 to 6. Note that the present disclosure is not limited to these examples. The present disclosure is indicated by the claims, and is intended to include all modifications made within the meaning and scope of equivalents of the claims. In the following description, the terms "lengthwise direction" and "axial direction" regarding a wire harness W1 are used synonymously. The term "cross section" means a cut surface when the wire harness W1 is cut in a direction orthogonal to the lengthwise direction.

As shown in FIG. 1, the wire harness W1 according to the first embodiment is a shielded type conductive path that includes two electric wires 10, a shield member 13 that is tubular, a pair of connector housings 14, an exterior member 15 (exterior tube) that is tubular, a pair of airtight keeping members 16 (pair of seals), and one check valve 18. Note that, in FIGS. 1 to 6, the thicknesses of the shield member 13, the exterior member 15, and the airtight keeping members 16 are exaggerated.

Each of the two electric wires 10 is a coated electric wire of an unshielded type formed by enclosing a conductor 11 with an insulating coating 12 that is tubular. As shown in FIGS. 3 to 6, each electric wire 10 has a circular outer circumferential shape when the electric wire 10 is cut perpendicular to the axis. The outer diameter dimensions of the two electric wires 10 are the same. The two electric wires 10 are arranged so as to be parallel to each other.

The shield member 13 is constituted by braided wires formed into an intermeshed tubular shape by weaving a plurality of metal wires. The shield member 13 is flexible so that the cross-sectional shape of the shield member 13 can be freely changed. The shield member 13 encloses the two electric wires 10 together. The pair of connector housings 14 are respectively arranged at the two ends of the wire harness W1 in the lengthwise direction thereof. Each of the connector housings 14 houses two terminal fittings (not shown) connected to the ends of the electric wires 10 and one shield shell (not shown). The two ends of the shield member 13 are connected to the shield shells.

The exterior member 15 is a tubular member that is made of a flexible material such as a synthetic resin. The exterior member 15 encloses the two electric wires 10 and the shield member 13 together. The exterior member 15 encloses a major portion of the exposed regions of the electric wires 10 between the pair of connector housings 14.

The pair of airtight keeping members 16 are provided at only two positions at the two ends of the exterior member 15 in the lengthwise direction thereof. The airtight keeping members 16 are constituted by sealing members formed by curing a thermosetting gel resin material. The airtight keeping members 16 hermetically seal the gaps between the outer circumferential surfaces of the electric wires 10 and the inner circumferential surface of the exterior member 15 and the gap between the two electric wires 10. The shield member 13 that is constituted by braided wires having many fine gaps is interposed between the outer circumferential surfaces of the electric wires 10 and the inner circumferential surface of the exterior member 15. The gel resin material is filled in the gaps between the braided wires, and therefore the gaps between the electric wires 10 and the exterior member 15 are reliably kept airtight A region between the pair of airtight keeping members 16 in the internal space of the exterior member 15 is an airtight space 17 that is isolated from the outside of the exterior member 15.

The check valve 18 is provided between the pair of airtight keeping members 16 in the lengthwise direction of the exterior member 15. The specific position to which the check valve 18 is attached is a central position of the exterior member 15 in the lengthwise direction thereof, or a position closer to either end than the center of the exterior member 15 in the lengthwise direction thereof. The check valve 18 is attached to the exterior member 15 so as to pass through the exterior member 15 from the outer circumferential surface to the inner circumferential surface of the exterior member 15. The portion of the exterior member 15 through which the check valve 18 passes is kept airtight using an adhesive, a sealing member, or the like (not shown). The check valve 18 is a normally closed valve member that normally keeps a closed state. The check valve 18 allows a fluid to flow from the inside (the airtight space 17) to the outside of the exterior member 15, but does not allow a fluid to flow from the outside (atmosphere) to the inside (the airtight space 17) of the exterior member 15.

The process of manufacturing the wire harness W1 will be described. The shield member 13 and the two electric wires 10 are inserted into the exterior member 15, the terminal fittings (not shown) fixed to the ends of the electric wires 10 are inserted into the connector housings 14, and both ends of the shield member 13 are connected to the shield shells (not shown). Furthermore, the exterior member 15 and the two electric wires 10 are positioned in the circumferential direction so that the check valve 18 is positioned in the circumferential direction to face the valleys between the two electric wires 10.

In a state where the exterior member 15 and the electric wires 10 are positioned, the gel resin material is applied to one or both of the inner circumferential surfaces of the two ends of the exterior member 15; and the outer circumferential surface of the shield member 13. The portion of the exterior member 15 to which the gel resin material is applied is pressed against the outer circumferential surfaces of the two electric wires 10. Thus, the gel resin material is filled in the gaps between the braided wires of the shield member 13, and is brought into close contact with the outer circumferential surfaces of the two electric wires 10 so as to be filled in the gaps between the two electric wires 10. In this state, the gel resin material is heated and cured to form the airtight keeping members 16. The airtight keeping members 16 hermetically seal the gaps between the inner circumferential surface of the exterior member 15 and the outer circumferential surfaces of the electric wires 10, the gaps between the braided wires of the shield member 13, and the gaps between the electric wires 10. As a result of the formation of the airtight keeping members 16, the airtight space 17 is formed in the region between the pair of airtight keeping members 16 in the inner space of the exterior member 15, which is hermetically sealed from the atmosphere.

Figure 2:
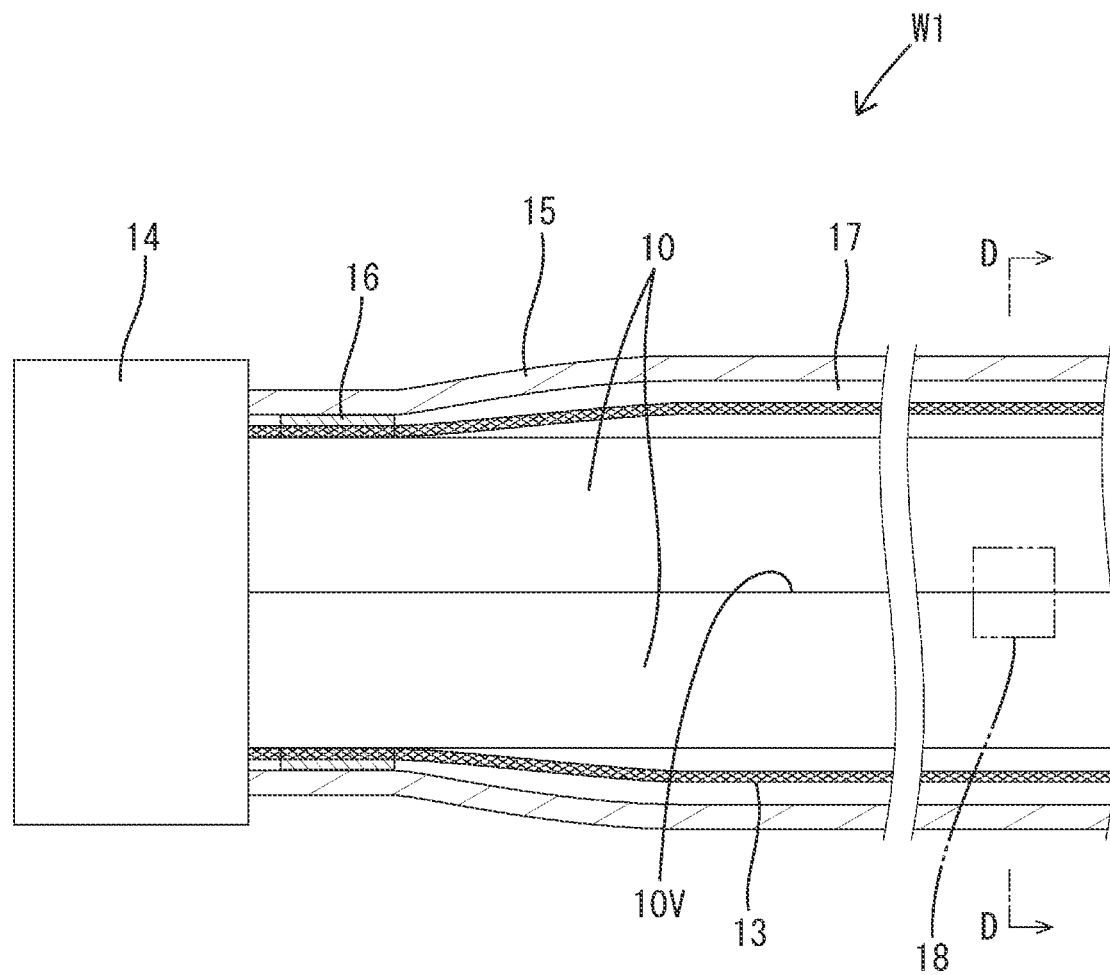
FIG. 2 is a partially cutaway plan view of a wire harness according to the first embodiment, showing a state before the interior of an exterior member thereof is vacuumed.
Figure 3:
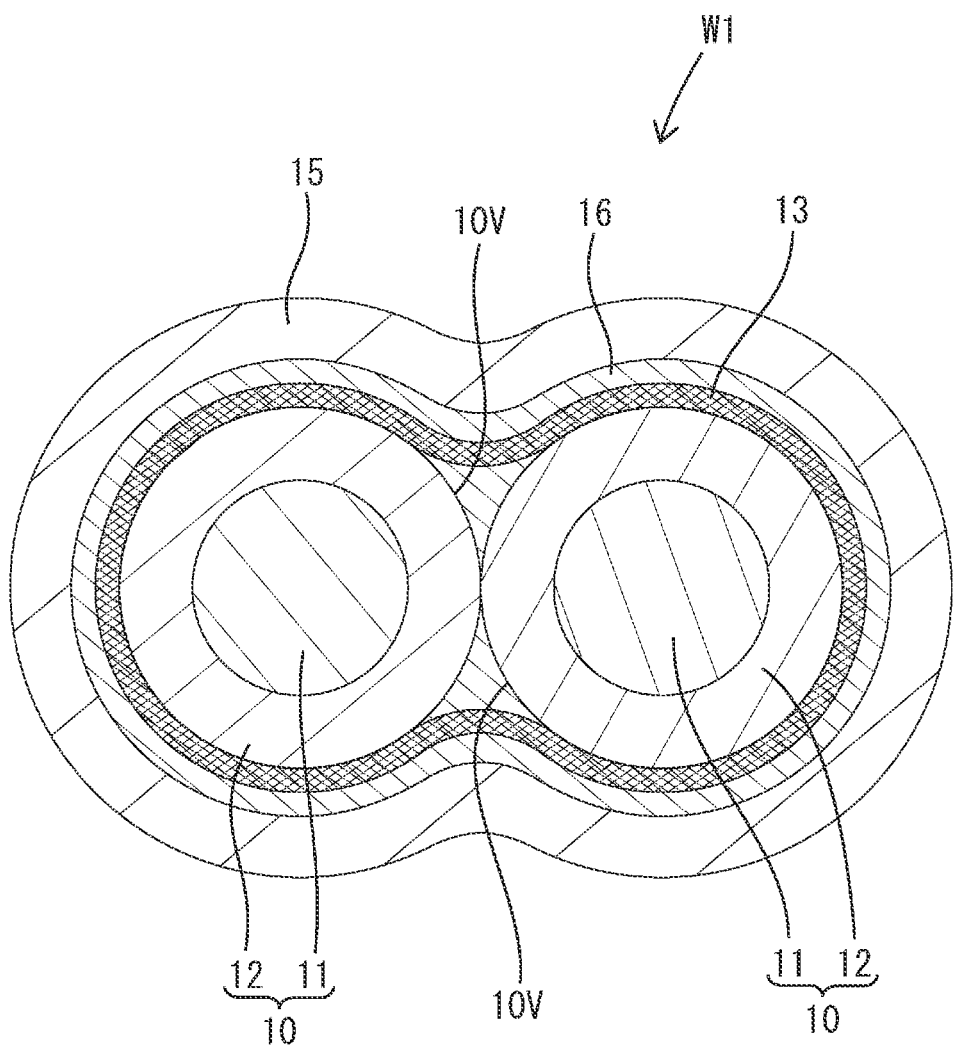
FIG. 3 is an enlarged cross-sectional view taken along an A-A line shown in FIG. 1.
Figure 4:
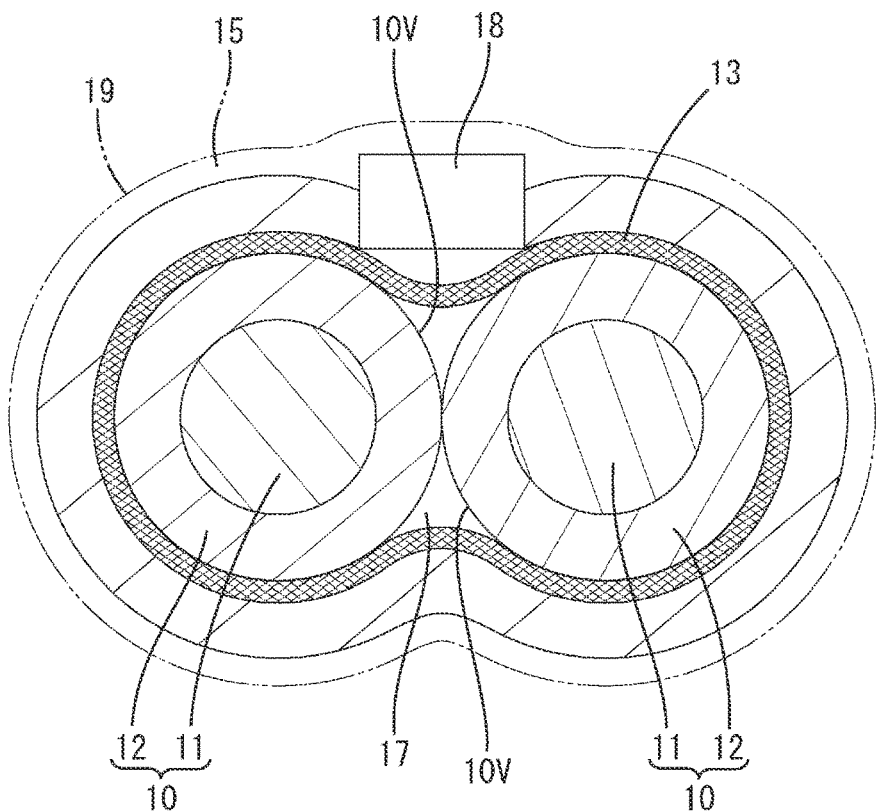
FIG. 4 is an enlarged cross-sectional view taken along a B-B line shown in FIG. 1.
Figure 5:
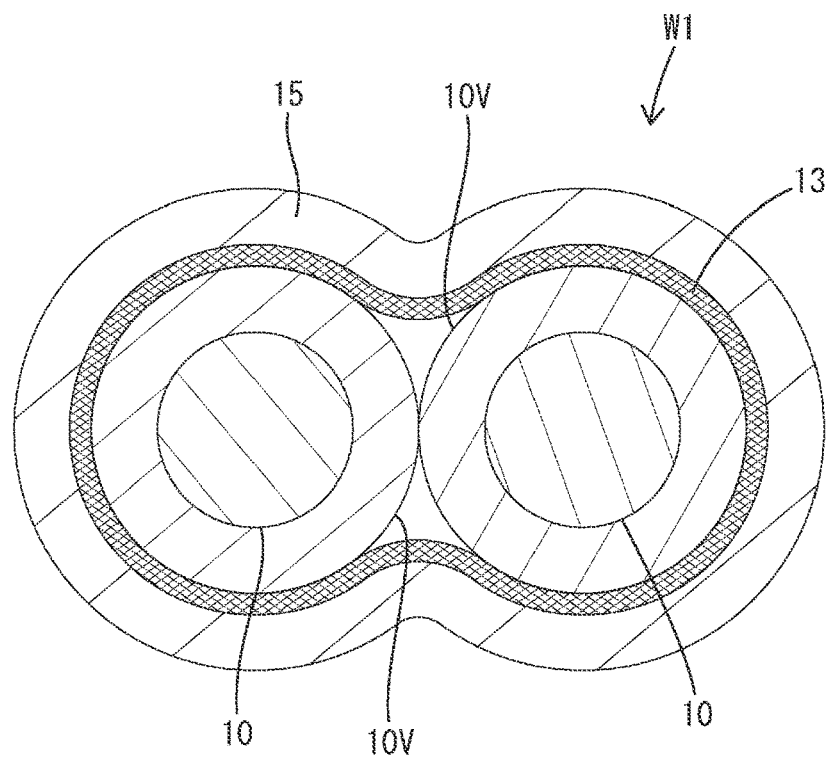
FIG. 5 is an enlarged cross-sectional view taken along a C-C line shown in FIG. 1.
Figure 6:
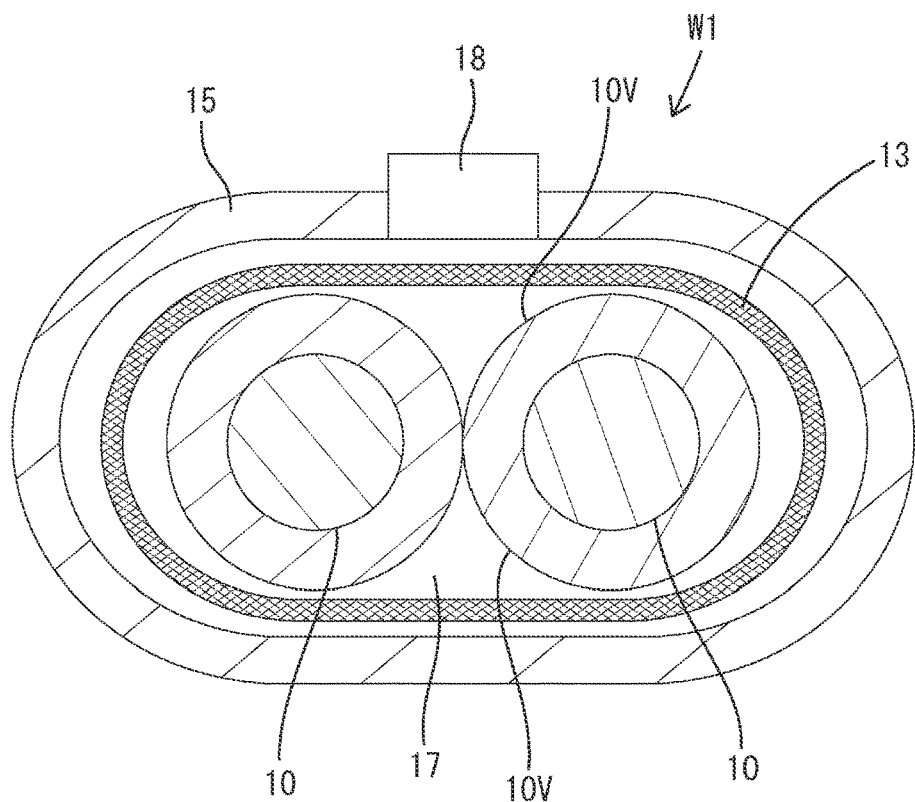
FIG. 6 is an enlarged cross-sectional view taken along a D-D line shown in FIG. 2.

In a state immediately after the interior of the exterior member 15 is sealed with the airtight keeping members 16, as shown in FIGS. 2 and 6, air is trapped in the airtight space 17, and this air is present between the outer circumferential surfaces of the electric wires 10 and the inner circumferential surface of the exterior member 15. The pressure of the air in the airtight space 17 is equal to the atmospheric pressure. In a state where air is present in the airtight space 17, a vacuum pump (not shown) is connected to the check valve 18, and the air in the airtight space 17 is vacuumed. After vacuuming is complete, the vacuum pump is removed from the check valve 18 and a piece of adhesive tape 19 is wrapped around the outer circumferential surface of the exterior member 15 to prevent the exterior member 15 from swelling.

As a result of vacuuming, the air in the airtight space 17 has a lower pressure than the atmospheric pressure, and therefore the exterior member 15 is pressed toward the electric wires 10 by the atmospheric pressure, is accordingly deformed to reduce the diameter thereof, and presses the shield member 13 toward the electric wires 10. A major portion (at least a portion) of the shield member 13 pressed by the exterior member 15 is brought into close contact with the outer circumferential surfaces of the electric wires 10 to bring the two electric wires 10 into close contact with each other. A major portion (at least a portion) of the exterior member 15 comes into close contact with the outer circumferential surface of the shield member 13. Thus, a major portion (at least a portion) of the exterior member 15 comes close to the two electric wires 10 with the shield member 13 sandwiched between the major portion of the exterior member 15 and the two electric wires 10. The amount of air remaining in the airtight space 17 is very small.

When the conductors 11 of the electric wires 10 generate heat due to the current passing therethrough, the heat of the electric wires 10 is directly transmitted to the shield member 13, is directly transmitted from the shield member 13 to the exterior member 15, and is released to the atmosphere from the outer circumferential surface of the exterior member 15. As the amount of air that is present in the heat transfer path from the electric wires 10 to the exterior member 15 is very small, the heat dissipation efficiency is excellent. The outer circumferential shape of each electric wire 10 is circular, and therefore valleys 10V are formed between the adjacent electric wires 10, the width of each of which decreases as the depth thereof increases. The shield member 13 cannot be brought into close contact with the electric wires 10 at the depths of the valleys 10V where the widths thereof are narrow, and therefore air remains between the exterior member 15 and the electric wires 10. However, the volume of the deep area of each valley 10V, that is, the volume between the outer circumferential surfaces of the electric wires 10 and the inner circumferential surface of the exterior member 15 is very small, and therefore the amount of air remaining in the valleys 10V is very small. Therefore, the thermal resistance caused by air is small, and the heat transfer efficiency is not greatly affected.

The wire harness W1 according to the first embodiment includes: an exterior member 15 that is flexible and tubular; and two electric wires 10 inserted into the exterior member 15. The inner circumferential surface of the exterior member 15 is brought close to the electric wires 10 by adjusting the pressure in an airtight space 17 inside the exterior member 15 to be lower than the atmospheric pressure. Since the exterior member 15 is close to the electric wires 10, the amount of air that is present between the electric wires 10 and the exterior member 15 and causes heat resistance is extremely small (very small). As a result, the heat transfer efficiency from the electrical wires 10 to the exterior member 15 is favorable, which provides excellent heat dissipation.

The exterior member 15 is provided with the check valve 18 that allows the air in the exterior member 15 to flow out to the atmosphere, and restricts the air from flowing into the interior of the exterior member 15 from the atmosphere (the outside of the exterior member 15). By vacuuming the exterior member 15 through the check valve 18, the internal pressure of the exterior member 15 can be adjusted to be lower than the atmospheric pressure. Even if the internal pressure of the exterior member 15 becomes higher than the atmospheric pressure, the internal pressure of the exterior member 15 can be returned to be lower than the atmospheric pressure by performing vacuuming again through the check valve 18.

The check valve 18 is positioned so as to face a valley 10V between the two adjacent electric wires 10. In the vacuuming process, the air in the exterior member 15 (in the airtight space 17) flows toward the valley 10V between the adjacent electric wires 10, and the exterior member 15 approaches the outer circumferential surfaces of the electric wires 10 from the sides far from the valleys 10V in the circumferential direction of the electric wires 10. Since the check valve 18 is positioned so as to face a valley 10V, it is possible to prevent air from remaining in regions other than the region in the valley 10V.

The wire harness W1 includes airtight keeping members 16 that provide an airtight space 17 that is held airtight in the exterior member 15. The check valve 18 is positioned in an intermediate region between the two airtight keeping members 16 in the axial direction of the electric wires 10. When the check valve 18 is positioned in the vicinity of one airtight keeping member 16, the longest exhaust path for vacuuming from the other airtight keeping member 16 to the check valve 18 is long. In the present embodiment, the check valve 18 is positioned in the intermediate region between the two airtight keeping members 16, and therefore the longest exhaust path from the airtight keeping members 16 to the check valve 18 is approximately ½ of the total length of exterior member 15, which is shorter.

In the wire harness W1, braided wires having fine irregularities are interposed between the outer circumferential surfaces of the electric wires 10 and the inner circumferential surface of the exterior member 15. In order to seal the gaps between the exterior member 15 and the electric wires 10, sealing members formed by curing a gel resin material are used as the airtight keeping members 16. The gel resin material is filled in the gaps between the meshes of the braided wires, and therefore the interior of the exterior member 15 can be kept airtight.

Second Embodiment

Figure 7:
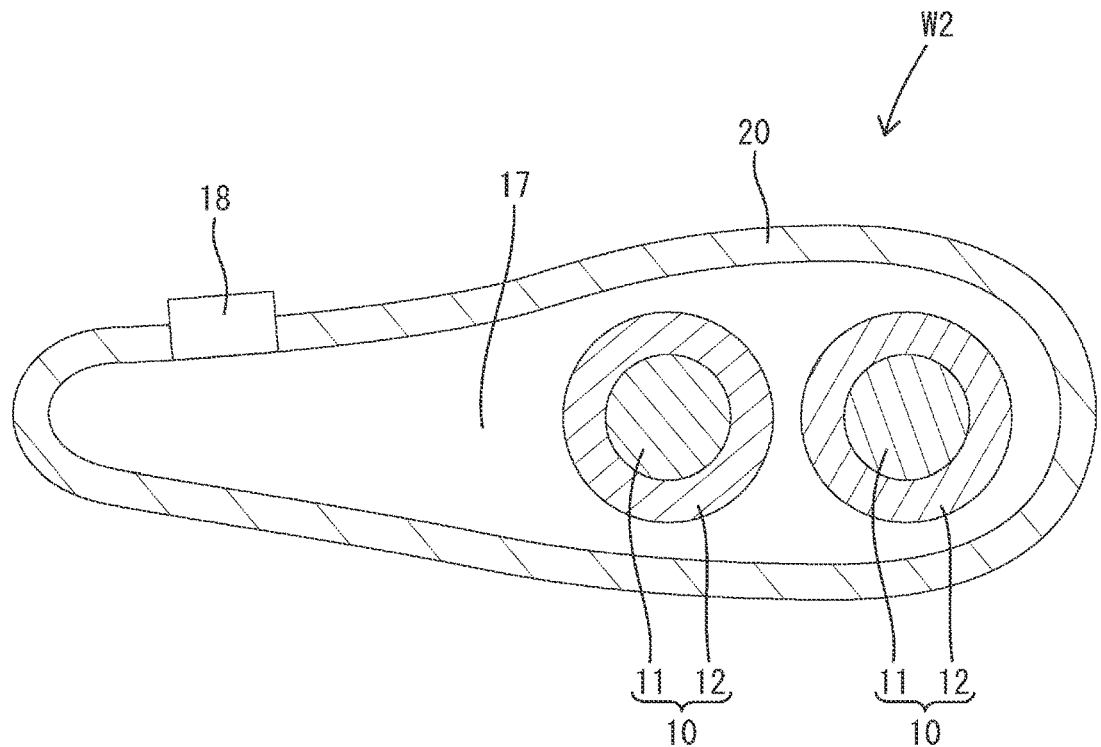
FIG. 7 is a cross-sectional view of a wire harness according to a second embodiment, showing a state before the interior of an exterior member thereof is vacuumed.
Figure 8:
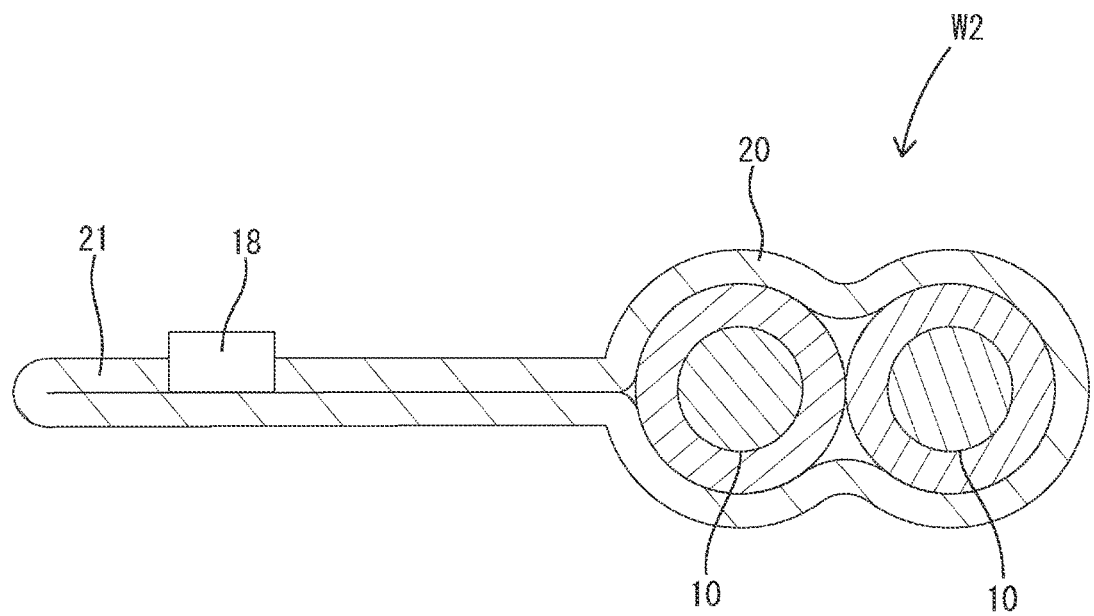
FIG. 8 is a cross-sectional view of a wire harness according to a second embodiment, showing a state before the interior of an exterior member thereof is vacuumed.

A second embodiment that embodies a wire harness according to the present disclosure will be described with reference to FIGS. 7 to 9. A wire harness W2 according to the second embodiment is different from the wire harness W1 according to the first embodiment, and is a conductive path of an unshielded type that does not include the shield member 13. The wire harness W2 includes two electric wires 10, a pair of connector housings (not shown), an exterior member 20 that is tubular, a pair of airtight keeping members (not shown), and one check valve 18. The electric wires 10, the connector housings, the airtight keeping members, and the check valve 18 are all the same members as those in the first embodiment.

The exterior member 20 is made of a flexible resin material as with the exterior member 15 in the first embodiment. In a cross section of the exterior member 20 cut in a direction orthogonal to the axial direction, the circumference of the exterior member 20 is set longer than the circumference of the exterior member 15 in the first embodiment. As shown in FIG. 7, the check valve 18 is provided at a position away from the two electric wires 10 in the width direction, which is the direction in which the electric wires 10 are arranged. When a vacuum pump (not shown) is connected to the check valve 18, and the air in the internal space (the airtight space 17) of the exterior member 20 is discharged, a portion of the exterior member 20 comes into close contact with the regions of the outer circumferential surfaces of the two electric wires 10 other than the region in the valley 10V between the two electric wires 10. At the same time, the portions of the exterior member 20 that are separated in the width direction from the portions that are in close contact with the electric wires 10 are formed into a close-contact folded portion 21 by vacuuming. The close-contact folded portion 21 includes the portion of the exterior member 20 to which the check valve 18 is attached.

Figure 9:
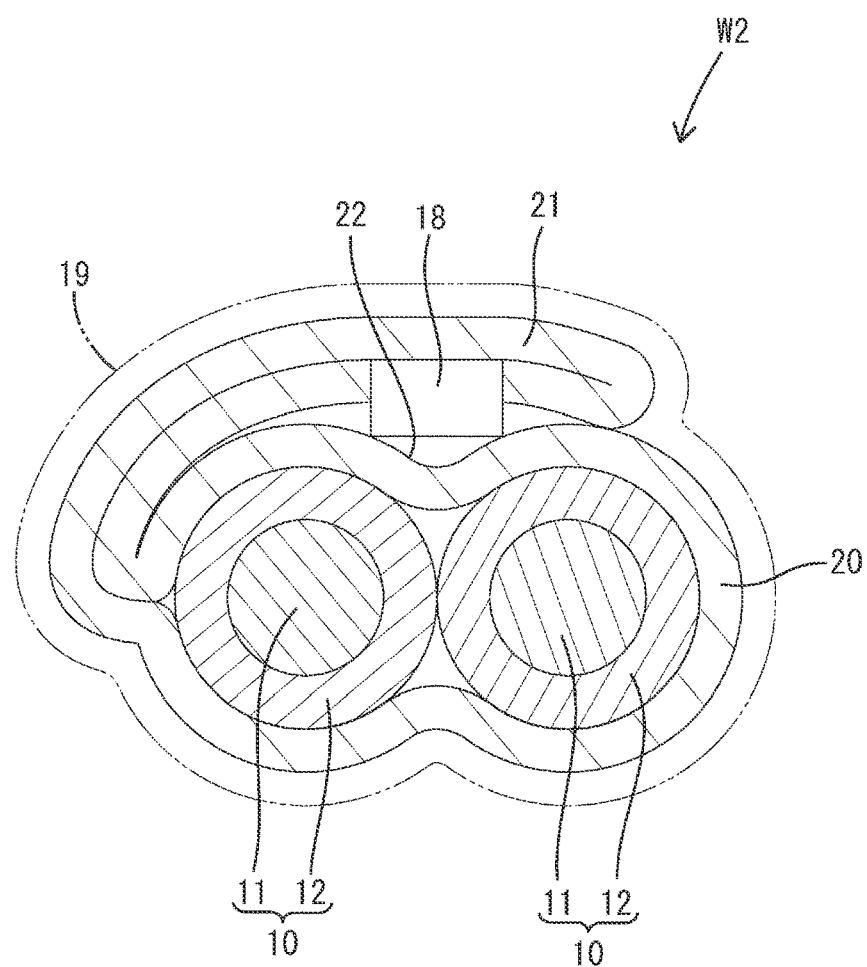
FIG. 9 is a cross-sectional view of a wire harness according to a second embodiment, showing a state where a check valve is placed in a valley between the electric wires.

After the air in the airtight space 17 is discharged, as shown in FIG. 9, the close-contact folded portion 21 is folded toward the electric wires 10, and a portion of the check valve 18 is housed in a recess 22 in the outer circumferential surface of the exterior member 20, which extends along the valleys 10V between the electric wires 10. Thereafter, a piece of adhesive tape 19 is wrapped around the outer circumferences of the close-contact folded portion 21 and the exterior member 20 to prevent the exterior member 20 from swelling and to keep the close-contact folded portion 21 from returning. Due to the piece of adhesive tape 19 thus wrapped, the check valve 18 is kept covered by the close-contact folded portion 21. Therefore, the check valve 18 is prevented from being obstructed by foreign objects. The components other than those described above are the same as those in the first embodiment, and therefore, the descriptions of the structure, action and effect will be omitted.

Third Embodiment

Figure 10:
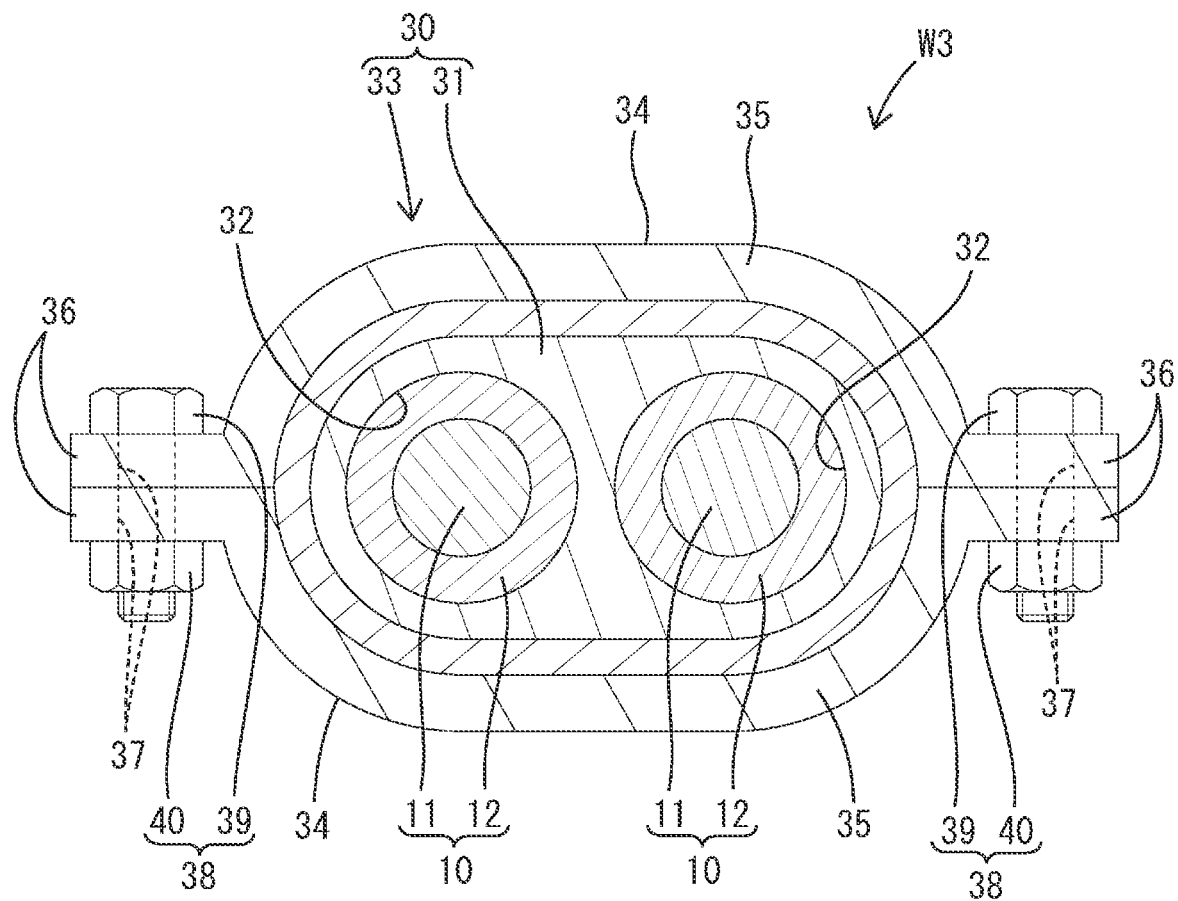
FIG. 10 is a cross-sectional view of a wire harness according to a third embodiment.

A third embodiment that embodies a wire harness according to the present disclosure will be described with reference to FIG. 10. A wire harness W3 according to the third embodiment is, as with the wire harness W2 according to the second embodiment, a conductive path of an unshielded type that does not include the shield member 13. The wire harness W3 includes two electric wires 10, a pair of connector housings (not shown), an exterior member 15 that is tubular, a pair of airtight keeping members 30, and one check valve (not shown). The electric wires 10, the connector housings, the exterior member 15, and the check valve are all the same members as those in the first embodiment.

Each of the airtight keeping members 30 according to the third embodiment includes an electric wire holding member 31 (electric wire holder) and a clamping member 33 (clamp). The electric wire holding member 31 is a single elastic component such as rubber. The outer shape of the electric wire holding member 31 when viewed parallel to the axis of the wire harness W3 is an oval shape elongated in the width direction. The electric wire holding member 31 is provided with two seal holes 32 passing through the electric wire holding member 31 in the axial direction. The two seal holes 32 are independent of each other. The opening shape of each seal hole 32 is circular, and the inner diameter of each seal hole 32 is the same as or slightly smaller than the outer dimensions of the wires 10.

The clamping member 33 includes a pair of half-split members 34 and two sets of fastening members 38. The pair of half-split members 34 are made of a highly rigid material such as metal or a hard synthetic resin and have a symmetrical shape when viewed in the axial direction. Each half-split member 34 includes a plate-shaped clamping portion 35 having a shape of a half-split oval, and a pair of plate-shaped attachment portions 36 protruding from the two ends of the plate-shaped clamping portion 35 in the width direction thereof. Each plate-shaped attachment portion 36 is provided with attachment holes 37 passing through the plate-shaped attachment portion 36 in the plate thickness direction.

When assembling each airtight keeping member 30, first, the two electric wires 10 are respectively inserted into the seal holes 32 of the airtight keeping member 30, and the outer circumferential surface of the airtight keeping member 30 is covered with the two ends of the exterior member 15. As a result, the exterior member 15 encloses the electric wire holding member 31 and the two electric wires 10. In this state, the plate-shaped clamping portions 35 of the pair of half-split members 34 are fitted onto the portion of the exterior member 15 enclosing the electric wire holding member 31, so that the plate-shaped attachment portions 36 overlap each other in the plate-thickness direction. Thereafter, bolts 39 included in the fastening members 38, are passed through the attachment holes 37, and nuts 40 included in the fastening members 38 are screwed onto the bolts 39 and tightened.

The tightening of the fastening members 38 holds the pair of half-split members 34 together. At the same time, the pair of plate-shaped clamping portion 35 presses the whole outer circumferential surface of the electric wire holding member 31 via the outer member 15. This pressing action maintains an airtight seal between the inner circumferential surface of the exterior member 15 and the outer circumferential surface of the electric wire holding member 31, and between the inner circumferential surfaces of the seal holes 32 and the outer circumferential surfaces of the electric wires 10. The above operation creates an airtight space (not shown) in the region between the pair of airtight keeping members 30 inside the outer member 15.

The wire harness W3 according to the third embodiment includes airtight keeping members 30 that keep the internal space of the exterior member 15 airtight. Each airtight keeping member 30 includes an electric wire holding member 31 that allows the electric wires 10 to hermetically pass therethrough, and a clamping member 33 that hermetically clamps the exterior member 15 between the clamping member 33 and the outer circumferential surface of the electric wire holding member 31. Since the airtight state of the internal space (airtight space) of the exterior member 15 can be mechanically maintained, there is no need for heat treatment or curing for hardening, unlike in the case where an adhesive is used. The components other than those described above are the same as those in the first embodiment, and therefore, the descriptions of the structure, action and effect will be omitted.

Other Embodiments

The present disclosure is not limited to the embodiments illustrated by the above description and the drawings, but is indicated by the claims. The present disclosure includes all modifications made within the meaning and scope of equivalents of the claims, and includes the following embodiments.

In the above-described first to third embodiments, two electric wires are included in one wire harness. However, three or more electric wires may be included in one wire harness. In such a case, a plurality of electric wires may be arranged side by side in parallel, or may be arranged in a bundled state.

In the above-described first to third embodiments, the outer diameters of the plurality of electric wires included in one wire harness are the same, but one wire harness may include a plurality of electric wires having different outer diameters.

In the above-described first to third embodiments, the electric wires have a circular cross-sectional shape, but the wire harness may include electric wires having a non-circular cross-sectional shape.

In the above-described first to third embodiments, the interior of the exterior member is maintained in an airtight state by arranging the airtight keeping members at the two ends of the exterior member. However, the internal space of the exterior member may communicate with the connector housings, the interior of which is kept airtight. In this case, the check valve may be provided in the connector housings. In addition, when a shield member constituted by braided wires or the like is interposed between the electric wires and the exterior member and the end portions of the shield member are connected to the shield shells in the connector housings, the interior of the connector housing may be kept airtight with a potting agent or the like.

In the above-described first to third embodiments, the check valve is positioned in an intermediate region between the two airtight keeping members. However, the check valve may be positioned in the vicinity of one of the airtight keeping members.

In the above-described first to third embodiments, after the interior of the exterior member is vacuumed, the check valve may be sealed with an adhesive, heat welding, or the like so that the valve cannot be opened.

In the above-described first to third embodiments, an adhesive may be applied over the entire length between the electric wires and the exterior member. With this configuration, even if a pinhole is formed in the exterior member or the sealing function of the check valve is deteriorated, the exterior member is not separated from the outer circumferential surfaces of the electric wires, so that outside air can be prevented from entering the interior of the exterior member.

In the above-described first embodiment, the check valve is positioned so as to face a valley between the adjacent electric wires. However, the check valve may be positioned so as to face a region other than the region in the valley between the electric wires.

In the above-described first embodiment, the braided wires are interposed between the electric wires and the exterior member, but the structure according to the first embodiment may also be applied to a wire harness having no braided wire.

In the above-described second embodiment, no braided wire is interposed between the electric wires and the exterior member. However, the structure in which the close-contact folded portion is placed over the outer circumferential surface of the exterior member after performing vacuuming as in the second embodiment and the check valve is housed in a valley between the electric wires may also be applied to a wire harness having braided wires.

In the above-described second embodiment, after the interior of the exterior member is vacuumed, the close-contact folded portion may be bonded using an adhesive so as not to open, and the close-contact folded portion may be cut at the bonded portion to be separated from the electric wires and the exterior member.

In the above-described second embodiment, the electric wires and the exterior member may be fixed to each other with an adhesive.

The invention claimed is:
1. A wire harness comprising:
an exterior tube that is flexible and tubular;
electric wires inserted into the exterior tube; and
airtight seals that keep an internal space of the exterior tube airtight,
wherein:
the exterior tube is close to or in close contact with the electric wires due to an internal pressure of the exterior tube being lower than atmospheric pressure,
the exterior tube is provided with a check valve that allows air in the exterior tube to flow out to an atmosphere, and restricts air from flowing into an interior of the exterior tube, and
the check valve is positioned in an intermediate region between two airtight seals of the airtight seals, in an axial direction of the electric wires.
2. The wire harness according to claim 1,
wherein the check valve is positioned so as to face a valley between two adjacent electric wires of the electric wires.
3. A wire harness comprising:
an exterior tube that is flexible and tubular;
electric wires inserted into the exterior tube; and
airtight seals that keep an internal space of the exterior tube airtight,
wherein the exterior tube is close to or in close contact with the electric wires due to an internal pressure of the exterior tube being lower than atmospheric pressure, and
wherein the airtight seals are formed by a cured gel resin material.
4. A wire harness comprising:
an exterior tube that is flexible and tubular;
electric wires inserted into the exterior tube; and
airtight seals that keep an internal space of the exterior tube airtight,
wherein each of the airtight seals includes:
an electric wire holder that allows the electric wires to hermetically pass therethrough; and
a clamp that hermetically clamps the exterior tube between the clamp and an outer circumferential surface of the electric wire holder.

* * * * *